Dec. 15, 1942.    H. FISCHLMAYR    2,305,308
AUTOMATIC TIMING MECHANISM FOR FUEL INJECTION PUMPS
Filed June 8, 1940    4 Sheets-Sheet 1

Inventor
Hans Fischlmayr
By Cumpston & Shepard
Attorneys.

Dec. 15, 1942.    H. FISCHLMAYR    2,305,308
AUTOMATIC TIMING MECHANISM FOR FUEL INJECTION PUMPS
Filed June 8, 1940    4 Sheets-Sheet 3

Inventor
Hans Fischlmayr
By Cumpston & Shepard
Attorneys.

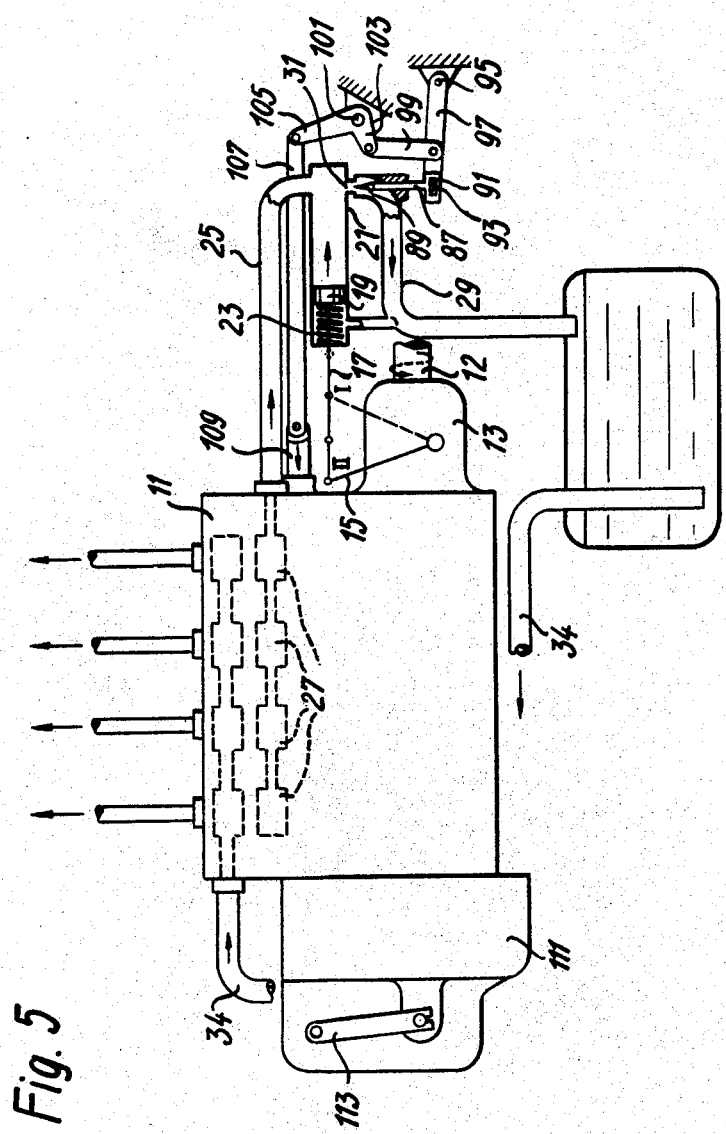

Patented Dec. 15, 1942

2,305,308

UNITED STATES PATENT OFFICE 2,305,308

AUTOMATIC TIMING MECHANISM FOR FUEL INJECTION PUMPS

Hans Fischlmayr, Grafelfing, near Munich, Germany; vested in the Alien Property Custodian Application June 8, 1940, Serial No. 339,531
In Germany February 17, 1939

13 Claims. (Cl. 123—140)

The present invention deals with mechanism for automatically timing fuel injection pumps used in connection with internal combustion engines of Diesel, semi-Diesel, and similar types.

Just as it is desirable to advance or retard the ignition spark of an internal combustion engine using gasoline fuel, when the speed of the engine increases or decreases, so also in an engine of the Diesel, semi-Diesel, or similar type, it is desirable to advance or retard the time of injection of the liquid fuel into the engine cylinder, as the speed of the engine increases or decreases. Various mechanisms for timing the injection have heretofore been proposed, but for one reason or another none of them has been entirely satisfactory.

An object of the present invention is the provision of a simple and improved timing mechanism of this character.

Another object is the provision of timing mechanism of sturdy construction requiring but few parts, and not likely to get out of order.

Still another object is the provision of timing mechanism compactly arranged mainly within the space usually occupied by the fuel injection pump, so that little additional space is needed for the timing mechanism.

To these and other ends the invention resides in certain improvements and combinations of parts, all as will be hereinafter more fully described, the novel features being pointed out in the claims at the end of the specification.

In the drawings:

Fig. 5 is a diagrammatic view similar to Fig. 1, illustrating an alternative arrangement.

The same reference numerals throughout the several views illustrate the same parts.

Figure 1:
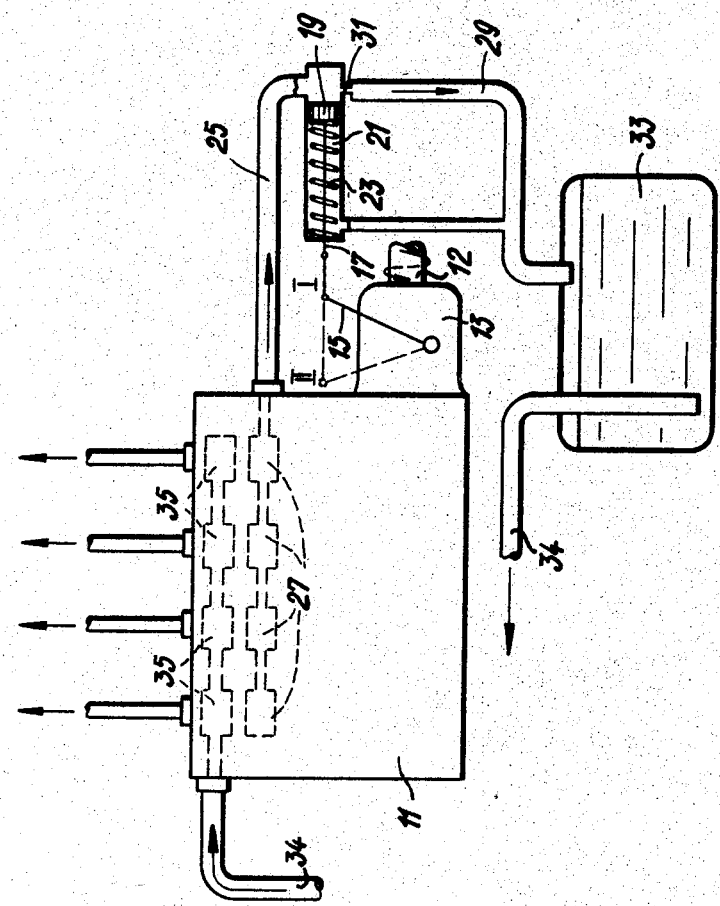
Fig. 1 is a diagrammatic view of a fuel injection pump with timing mechanism constructed in accordance with one embodiment of the present invention.

Referring first to Fig. 1 there is shown diagrammatically a fuel injection pump 11 which may be constructed in general in any known form. For instance, except as otherwise herein disclosed, the pump may be of the same general construction disclosed in United States Patent 2,131,779, granted October 4, 1938, for an invention of Kurt Zwick, Fritz Deckel, Hans Fischlmayr and Julius Ulsamer. The internal combustion motor (not shown) with which this pump is used, drives a shaft 12, which in turn drives the main operating shaft of the pump (not shown in Fig. 1 but corresponding to the shaft 30 of said patent) through the usual adjustable coupling device 13 which, by shifting the control lever 15, turns the pump shaft a slight amount in one direction or the other relatively to the shaft 12, to vary the timing of the pump relatively to the shaft 12, and consequently to vary the time of injection of the fuel into the cylinders of the engine, relatively to the movements of the pistons in those cylinders.

Figure 2:
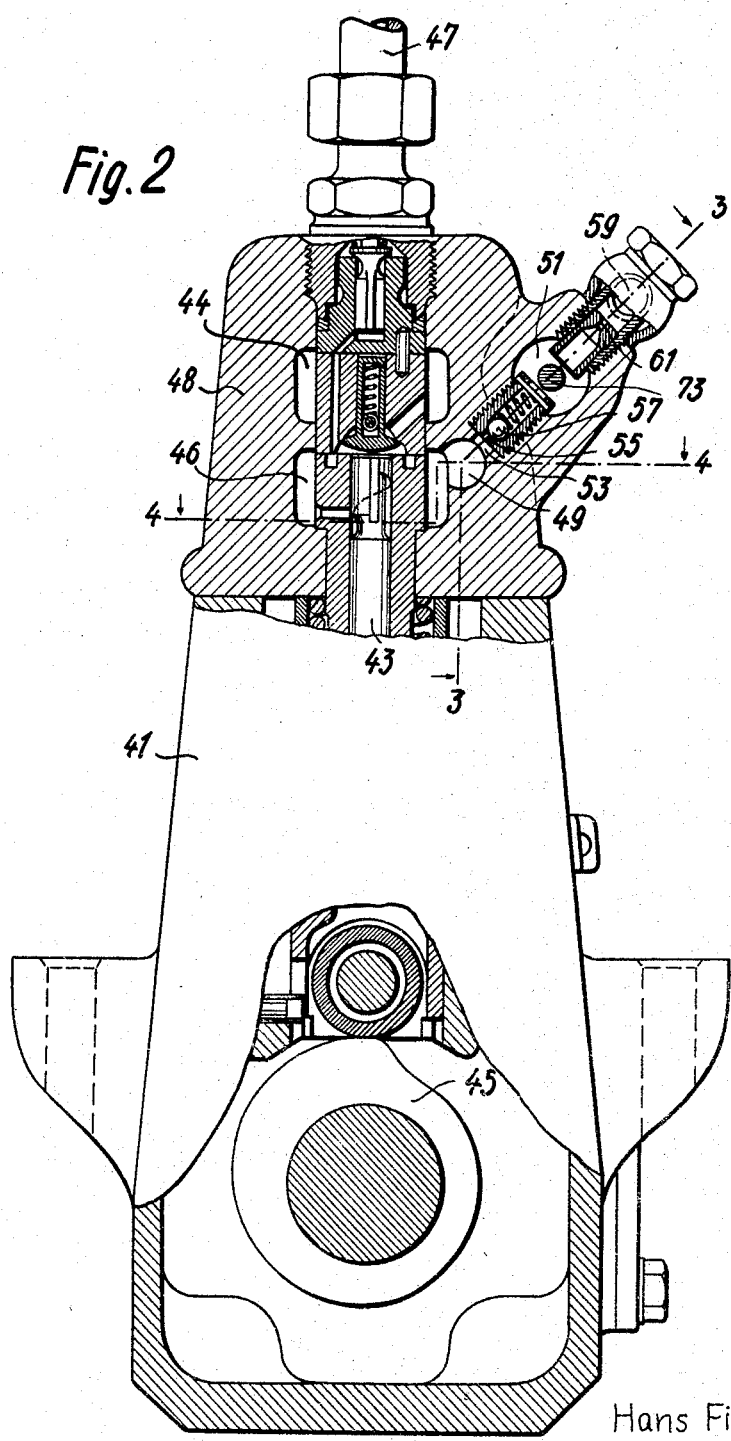
Fig. 2 is an end elevation, with parts in vertical cross section, of such a pump.

This adjustable coupling or timer 13 may be of any suitable known construction, and it is sufficient for present purposes to say that it may operate on the same principles disclosed in United States Patent 930,495, granted August 10, 1909, to Schmidt, or United States Patent 1,158,876, granted November 2, 1915, to Watson, or upon the same principles as the parts 58, 59, and 61 in Fig. 2 of the drawings of the United States Patent 1,845,600, granted February 16, 1932, to Herr. In Fig. 1 of the present drawings, the full line position I of the control lever 15 corresponds to the most retarded injection timing, while the dotted line position II corresponds to the most advanced injection timing, the lever being movable to any desired position between these two limits.

The timing control lever is connected to and moved by a rod 17 connected to a piston 19 in a cylinder 21, normally urged by a coiled spring 23 in a rightward direction, that is, in the direction toward retarded timing. A conduit 25 leads to that portion of the cylinder 21 to the right of the piston 19, from the overflow or by-pass spaces 27 around the cylinders of the fuel pump, all of these spaces being connected to each other and to the conduit 25 so that the excess or by-pass fuel from each cylinder of the pump will flow through the conduit 25 and enter the right hand end of the cylinder 21.

A discharge conduit 29, also connected to the right hand end of the cylinder 21, leads back to the fuel tank 33, and in this conduit 29 is a throttling orifice or restriction 31. The excess or overflow fuel from the pump entering the cylinder 21 through the conduit 25, can normally leave this cylinder only through the throttling orifice 31. Thus the greater the quantity of fuel delivered to the cylinder 21 per unit of time, the greater will be the liquid pressure built up within the cylinder, tending to move the piston 19 leftwardly against the action of the spring 23.

Fuel is supplied to the pump 11 from the fuel tank 33, through a conduit 34 (by the aid of a separate feed pump if necessary) to the suction spaces 35 associated with the cylinders of the pump. These suction spaces 35 correspond to the suction spaces 105 of said Zwick Patent 2,131,779, while the overflow or by-pass spaces 27 in Fig. 1 of the present drawings correspond to the overflow spaces 151 of said Zwick patent. In the present pump, however, the connections 153, etc., between the suction spaces 105 and overflow spaces 151 of the Zwick patent are omitted so that the excess fuel discharged into the overflow spaces 151 (or spaces 27 in the present drawings) can not flow directly back to the suction spaces 105 (or spaces 35 of the present drawings) but must be discharged through the conduit 25 into the cylinder 21.

The operation of the timing mechanism diagrammatically illustrated in Fig. 1 is as follows:

When the motor to which the injection pump is connected is running idly or at low speed, the amount of overflow or by-passed fuel passing into the conduit 25 per unit of time is relatively small. The throttling orifice 31 offers but little resistance to such a slight flow of liquid, so that the overflow fuel can escape from the cylinder 21 practically as fast as it is delivered thereto, with the consequence that the piston 19 remains at the right hand end of its travel, under the influence of the spring 23, or is displaced only to a slight extent from such position, the control lever 15 of the timing device thus being in the position or almost in the position corresponding to the most retarded injection of fuel into the engine.

When the engine is to be run at higher speed, a greater quantity of fuel is injected by the pump into the engine at each revolution of the pump, and less fuel per revolution goes into the overflow spaces 27 and the conduit 25. But due to the speeding up of the pump, although the overflow quantity of fuel is slightly less per revolution of the pump, it is greater per unit of time than when the engine was running more slowly. The greater quantity of fuel per unit of time which is introduced into the cylinder 21 meets increased resistance from the throttling orifice 31, and so builds up a pressure in the cylinder 21 (to the right of the piston 19) approximately proportional to the increased rate per unit of time at which the fuel is being delivered to the cylinder. This pressure causes leftward movement of the piston 19 against the force of the spring 23, moving the timing device control lever 15 leftwardly, in a direction toward the position of advanced injection. Thus the time of beginning of the injection, relatively to the cycle of the engine cylinders, is advanced more and more, as the speed of the engine increases, and conversely as the speed of the engine decreases, the pressure of the excess fuel acting on the piston 19 becomes less and less, so that the control lever 15 moves back toward the right and the injection becomes more and more retarded.

Figure 3:
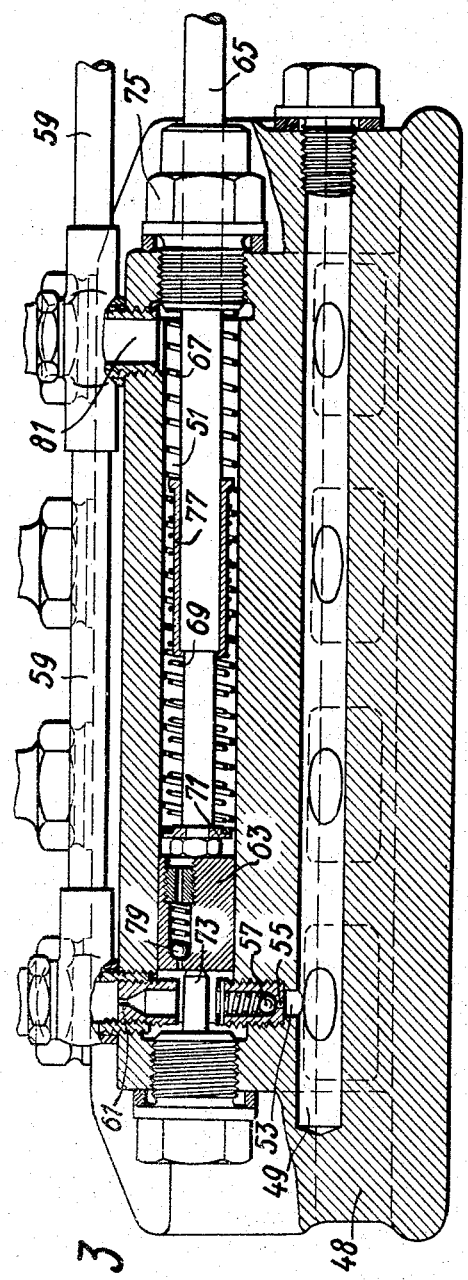
Fig. 3 is a longitudinal section taken approximately on the line 3—3 of Fig. 2.
Figure 4:
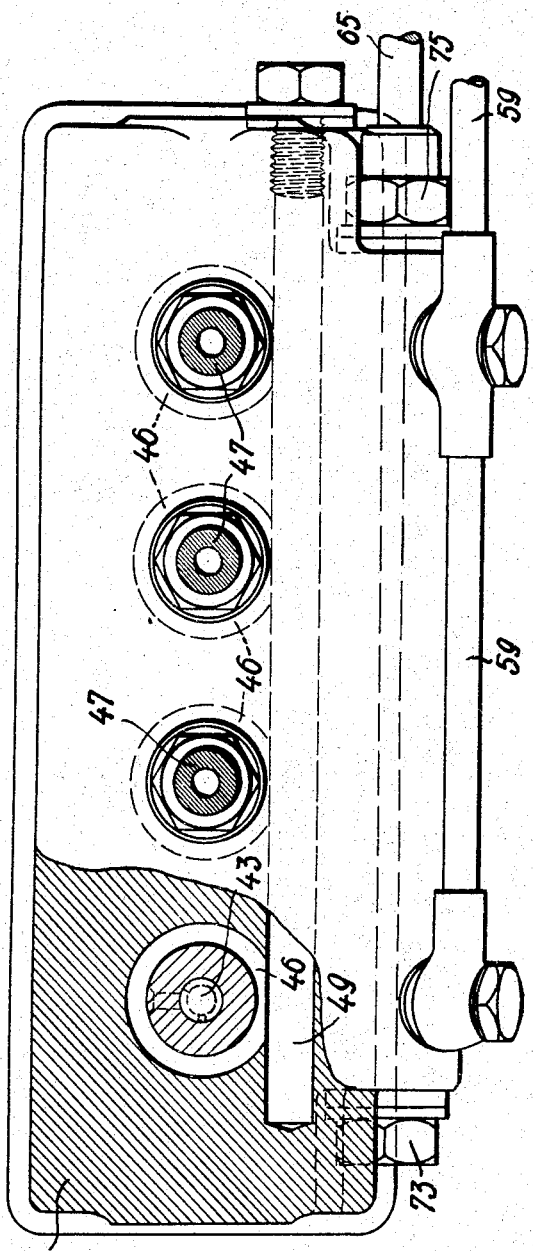
Fig. 4 is a view of the pump partly in plan and partly in horizontal section taken approximately on the line 4—4 of Fig. 2.

Further details of construction of a pump operating on the same principles diagrammatically illustrated in Fig. 1, are shown in Figs. 2 to 4 of the drawings, to which reference is now made. As above stated, the pump may be the same in general as that disclosed in said Zwick Patent 2,131,779. The pump 41 here illustrated has four individual pump plungers 43, arranged in a row, to deliver fuel to four cylinders of a connected engine. These plungers 43 correspond to the plungers 47 in said Zwick patent, and are driven in known manner by the cam shaft 45 corresponding to the cam shaft 39 of said patent, which cam shaft is driven from the engine through the variable coupling or timing device 13 of Fig. 1 of the present drawings.

In the upper part 48 of the pump, inlet or suction chambers 44 and overflow or by-pass chambers 46 surround each plunger cylinder, and correspond to the inlet or suction chambers 105 and the overflow or by-pass chambers 151 in said Zwick patent, except that the two chambers in said Zwick patent are connected to each other, whereas in the present pump the chambers are not connected directly to each other, and fuel in the overflow chambers 46 can not flow directly back into the suction chambers 44. The fuel to be injected is conveyed from the pump to the engine through the conduits 47.

A bore 49 extending longitudinally along the upper part 48 of the pump, serves to connect all of the overflow spaces 46 with each other. Another bore 51 extends parallel to the bore 49 and is connected thereto by the conduit 53, in which is placed a throttling orifice 55 and a spring pressed one-way check valve 57, to damp the pressure pulsations of the fuel flowing from the bore 49 to the bore 51, and to prevent any fuel being drawn back from the bore 51 into the bore 49 and overflow spaces 46 during the suction strokes of the pump plungers. An individual throttling orifice and check valve could be provided in connection with each overflow space 46, if desired, between such space and the bore 49, although the arrangement shown is quite satisfactory and more economical.

A discharge conduit 59 leads from the bore 51 to the fuel tank or any other suitable reservoir, and corresponds to the conduit 29 in the diagrammatic illustration in Fig. 1. Interposed at a suitable place in this conduit 59 is the throttling orifice 61, corresponding to the throttling orifice 31 in Fig. 1. This orifice 61 is preferably in the form of an apertured plug which is accessible so that it can be taken out and replaced by another plug with a larger or smaller aperture in order to change, when necessary, the flow resistance characteristics.

Longitudinally movable in the cylinder constituted by the bore 51 (which corresponds to the cylinder 21 in the diagrammatic illustration in Fig. 1) is a plunger 63, corresponding to the piston 19 in Fig. 1. The pressure of the fuel to the left of the plunger 63 constantly tends to move it rightwardly into contact with the end of a rod 65 slidable longitudinally through a stuffing box in one end of the cylinder 51, and corresponding to the rod 17 in Fig. 1 of the drawings, this rod 65 being connected to the control arm 15 of the timing device 13 (Fig. 1). Two springs 67 and 69, surrounding the rod 65, press leftwardly upon a spring seat 71 connected to the rod, and tend to push the rod 65 and the plunger 63 leftwardly to a position determined by the stop pin 73, which position corresponds to the most retarded timing of the fuel injection. The outer spring 67 reacts at its left end against the left end of the gland 75 which closes the right end of the cylinder 51, and thus the spring 67 acts leftwardly on the rod 65 at all times. The other spring 69, however, reacts at its right end on a flange or shoulder on a sleeve 77 which is slidable longitudinally on the rod 65 through a limited range, the sleeve having also a flange which seats on a shoulder on the rod to limit rightward movement of the sleeve. When the rod 65 is in or near the position shown in Fig. 3, the sleeve 77 is in contact with the shoulder on the rod and the spring 69, although under compression, does not tend to move the rod 65 in either direction. But when the rod 65 moves farther to the right, the right hand end of the sleeve 77 comes against the gland 75, and further rightward movement of the rod 65 is resisted by the spring 69 as well as the spring 67. With this spring arrangement, there is relatively slight resistance (from the spring 67 alone) to the first part of the rightward movement of the rod 65, so that when the engine is started and acceleration begins, the timing is quickly advanced to an intermediate position, and then when the speed of the engine increases still further, the second spring 69 comes into play and increases the resistance to a further advance in the timing.

The range of movement of the rod 65 can be changed by changing the stop pin 73 (which is formed on the end of a removable screw plug, as shown) and the gland 75, while the characteristics of movement within this range can be changed by replacing either or both of the springs 67 and 69 with springs of greater or less power, by replacing the tubular sleeve 77 with one of a different length, and by changing the throttling orifice 61. By taking advantage of these possibilities of change, the characteristics of the mechanism can be suited to those of the engine with which it is to be used, in order to obtain the most beneficial results.

To avoid an undesirably high pressure of fuel in the cylinder 51 to the left of the plunger 63 at high speed operation, it is desirable to provide, as a safety valve, a small passageway through the plunger 63, as shown in Fig. 3, this passageway being provided with a valve 79 spring pressed toward its seat and normally held closed unless the pressure to the left of the valve exceeds a predetermined amount, in which event the valve can open against the force of its spring and allow some of the fuel to pass to the right of the plunger 63 and escape from this part of the cylinder 51 through the connection opening 81 leading into the discharge conduit 52.

The mechanism of this form operates on the same principles as those diagrammatically illustrated in Fig. 1. When the engine is running at low speed, with small quantities of fuel injected into the cylinders, the surplus fuel entering the overflow space 46 and conduit 49 is large per revolution of the pump but small per unit of time, and it may escape readily through the throttling orifice 61 without creating much pressure to the left of the plunger 63. Under these conditions the plunger 63 and the rod 65 remain at or near the left hand limits of travel, corresponding to retarded injection. When greater quantities of fuel are delivered to the engine and the engine speeds up, then the quantity of excess fuel passing to the overflow space 46 and gathering conduit 49 becomes less per revolution of the pump but greater per unit of time, and the increased volume per unit of time can not pass so easily through the throttling orifice 61, so that the pressure to the left of the plunger 63 is increased and this plunger is moved rightwardly, likewise moving the rod 65 in a direction to advance the timing of the injection. Since the variations in quantity of overflow fuel per revolution of the pump, between idle condition and full load condition, are relatively small in comparison to the much greater variations per unit of time due to the speeding up or slowing down of the engine, it follows that the movements of the control rod 65 are practically proportional to the speed at which the engine is running.

There is, however, some slight variation caused by the larger or smaller quantities of overflow fuel per revolution, and if it is desired to eliminate the slight influence on the timing which is thus produced, it can be done by employing the arrangement illustrated diagrammatically in Fig. 5 of the drawings, the main parts of which construction are the same as those in Fig. 1, and are designated by the same numerals. In this construction of Fig. 5, however, in place of the fixed throttling orifice 31, there is provided a variable throttling orifice, produced by a needle 87 extending through a wall of the conduit 29 in a liquid tight but longitudinally movable manner, and having a conical or otherwise suitably tapered end 89 for entering the throttling orifice 31. By moving the needle 89 in one direction or the other, to project the pointed end farther into or withdraw it farther from the orifice 31, the effective flow cross section of the orifice 31 may be changed. Other suitable means, controlled in a manner similar to that set forth below, could be used for changing the effective cross section of the orifice in place of the tapered needle.

At its outer end the needle has a transverse slot 91, into which extends a pin 93 on a lever 97 pivotally supported at 95. A link 99 is pivoted to this lever 97 and to one arm 103 of a bell crank supported on a pivot 101. The other arm 105 of this bell crank is connected by a link 107 to the control rod 109 of the fuel injection pump, this control rod corresponding, for example, to the control rod 60 in said Zwick Patent 2,131,779. Movement of the rod in one direction or the other increases or decreases the injected quantity of fuel and conversely decreases or increases the overflow or by-pass quantity of fuel per revolution of the pump.

This control rod 109 may be regulated either by a centrifugal regulator or governor indicated diagrammatically at 111, or through an adjusting lever 113, or in any other suitable manner, the details of the way in which the rod 109 is moved being unimportant for present purposes.

This form of device operates as follows:

Assume that the motor is running at full load, and that it is desired to cut down the quantity of fuel injected per revolution, to cause the motor to run at partial load. To do this, the control rod 109 is shifted in the direction of the arrow associated therewith in Fig. 5, and this affects the pump mechanism (as explained, for example, in said Zwick Patent 2,131,779) in a manner to decrease the injected quantity and increase the overflow quantity of fuel at each revolution of the pump. Therefore, an increased quantity of fuel per revolution begins to flow through the conduit 25 into the cylinder 21. Due to the inertia of the moving parts, the motor and pump do not immediately slow down but continue for a moment to turn at the same speed as before. With the parts still turning at the same speed and with an increased overflow per revolution, a greater quantity of fuel per unit of time is introduced into the cylinder 21, and if the throttling orifice 31 is of constant size, as in the previous embodiments, this would result in a momentarily increased pressure in the cylinder 21, which would move the control lever 15 in a direction to advance the timing.

Under some conditions, this advance of the timing at the instant when the motor is about to be slowed down, may be undesirable, and such advance is avoided with the present mechanism, because the movement of the control rod 109 has at the same time, through the connecting parts 107, 105, 99, and 97, moved the needle 87 downwardly to withdraw it partially from the orifice 31, thus increasing the size of the orifice so that the increasing amount of overflow fuel can escape from the cylinder 21 without building up any higher pressure in this cylinder.

Similarly, if the engine is running slowly and the control rod 109 is shifted to increase the quantity of injected fuel to speed up the engine, the overflow quantity of fuel per revolution would be decreased, and without the adjustable control of the orifice 31, the pressure in the cylinder 21 would momentarily fall (until the engine and pump had actually speeded up), thus retarding the timing momentarily. But with the present arrangement, this operation is accompanied by an automatic upward movement of the needle 87, which reduces the area of the orifice 31 so that the pressure in the cylinder does not drop, and the timing is not retarded while the speed of revolution remains the same, but is gradually advanced as the motor and pump speed up. Thus the automatic timing is strictly in accordance with the speed of the engine and is not affected by the movements of the control rod 109 in one direction or the other to increase or decrease the injected quantity of fuel.

In designing the orifice control member 87, 89, care is taken, of course, to shape this control member in such manner that the increase or decrease in the effective cross sectional flow area of the orifice 31, due to a given movement of the member 87, properly balances the increase or decrease in the quantity of fuel which results from that movement of the control rod 109 which produces the given movement of the member 87. If desired, the cross sectional shape of the member 87, 89 can also be made so that in one or several zones of the control range, the pressure fluctuations caused by changes in the quantity of the overflow or excess fuel may manifest themselves to a greater or lesser extent, in order to adapt the mechanism as perfectly as possible to the individual characteristics of the particular engine and of the particular pump with which this mechanism is to be used.

The movements of the cross section changing member 87, instead of being effected by movements of the control rod 109, could also be effected directly by the operating lever 113, if desired, in which case the flow cross section of the orifice 31 would be changed whenever the pump delivery rate is altered by moving the lever 113, but would not be changed in accordance with those movements of the control rod 109 which are produced solely by the centrifugal governor 111 rather than by the lever 113.

While certain embodiments of the invention have been disclosed, it is to be understood that the inventive idea may be carried out in a number of ways. This application is therefore not to be limited to the precise details described, but is intended to cover all variations and modifications thereof falling within the scope of the appended claims.

I claim:

1. A fuel injection pump of the type by-passing a quantity of excess fuel at each cycle of operation and having adjustable timing means for varying the time of beginning a fuel injection cycle, characterized by the provision of a chamber for receiving the by-passed excess fuel, a restricted outlet for escape of fuel from said chamber so that an increase or decrease in the quantity of excess fuel delivered to said chamber per unit of time tends to produce respectively an increase or decrease in the fuel pressure within said chamber, means responsive to a change in pressure within said chamber for changing the adjustment of said timing means to advance the timing upon an increase in pressure and to retard the timing upon a decrease in pressure within said chamber, and a one-way check valve in the line of flow of excess fuel from said pump to said chamber, so that fuel may not be drawn backwardly from said chamber to said pump during a suction stroke of the pump.

2. A fuel injection pump of the type by-passing a quantity of excess fuel at each cycle of operation and having adjustable timing means for varying the time of beginning a fuel injection cycle, characterized by the provision of a chamber for receiving the by-passed excess fuel, a restricted outlet for escape of fuel from said chamber so that an increase or decrease in the quantity of excess fuel delivered to said chamber per unit of time tends to produce respectively an increase or decrease in the fuel pressure within said chamber, means responsive to a change in pressure within said chamber for changing the adjustment of said timing means to advance the timing upon an increase in pressure and to retard the timing upon a decrease in pressure within said chamber, and a throttling restriction in the line of flow of excess fuel from said pump to said chamber, to tend to damp pressure pulsations in the excess fuel before they reach said chamber.

3. A fuel injection pump of the type by-passing a quantity of excess fuel at each cycle of operation and having adjustable timing means for varying the time of beginning a fuel injection cycle, characterized by the provision of a chamber for receiving the by-passed excess fuel, a restricted outlet for escape of fuel from said chamber so that an increase or decrease in the quantity of excess fuel delivered to said chamber per unit of time tends to produce respectively an increase or decrease in the fuel pressure within said chamber, a member movable in response to pressure changes within said chamber, a connection between said member and said adjustable timing means to move said means in timing-advancing direction upon an increase in pressure in said chamber and in timing-retarding direction upon a decrease in pressure within said chamber, a spring tending to move said member in timing-retarding direction against the force of presure within said chamber, and a removable and replaceable stop for limiting movement of said member in said retarding direction.

4. A fuel injection pump of the type by-passing a quantity of excess fuel at each cycle of operation and having adjustable timing means for varying the time of beginning a fuel injection cycle, characterized by the provision of a chamber for receiving the by-passed excess fuel, a restricted outlet for escape of fuel from said chamber so that an increase or decrease in the quantity of excess fuel delivered to said chamber per unit of time tends to produce respectively an increase or decrease in the fuel pressure within said chamber, a member movable in response to pressure changes within said chamber, a connection between said member and said adjustable timing means to move said means in timing-advancing direction upon an increase in pressure in said chamber and in timing-retarding direction upon a decrease in pressure within said chamber, a spring tending constantly to move said member in timing-retarding direction against the force of pressure within said chamber, and a second spring normally ineffective to tend to move said member so long as said member is near the retarded end of its range of movement and coming into play as said member moves a substantial distance in timing-advancing direction to produce increased resistance to further movement in said timing-advancing direction.

5. A construction as described in claim 4, further characterized by a sleeve associated with said member against which one end of said second spring bears, said sleeve reacting against said member while said member is near the retarded end of its range of movement and reacting against a fixed abutment when said member moves a substantial distance in timing-advancing direction.

6. A fuel injection pump of the type by-passing a quantity of excess fuel at each cycle of operation and having adjustable timing means for varying the time of beginning a fuel injection cycle, characterized by the provision of a chamber for receiving the by-passed excess fuel, a restricted outlet for escape of fuel from said chamber so that an increase or decrease in the quantity of excess fuel delivered to said chamber per unit of time tends to produce respectively an increase or decrease in the fuel pressure within said chamber, a plunger in said chamber normally retaining the excess fuel in that part of said chamber which lies to one side of said plunger, said plunger being movable in said chamber in response to variations in pressure of said excess fuel, an operative connection between said plunger and said adjustable timing means to move said means in accordance with movements of said plunger, a passageway leading through said plunger, and a safety valve associated with said passageway so that when the fuel pressure in said chamber on one side of said plunger exceeds a predetermined amount, fuel may pass through said passageway and safety valve to enter the other portion of said chamber on the other side of said plunger.

7. A fuel injection pump of the type by-passing a quantity of excess fuel at each cycle of operation and having adjustable timing means for varying the time of beginning a fuel injection cycle, characterized by the provision of a chamber for receiving the by-passed excess fuel, a restricted outlet for escape of fuel from said chamber so that an increase or decrease in the quantity of excess fuel delivered to said chamber per unit of time tends to produce respectively an increase or decrease in the fuel pressure within said chamber, a member movable in response to pressure changes within said chamber, a connection between said member and said adjustable timing means to move said means in timing-advancing direction upon an increase in pressure in said chamber and in timing-retarding direction upon a decrease in pressure within said chamber, a spring tending constantly to move said member in timing-retarding direction against the force of pressure within said chamber, a second spring normally ineffective to tend to move said member so long as said member is near the retarded end of its range of movement, said second spring coming into play as said member moves a substantial distance in timing-advancing direction to produce increased resistance to further movement in such direction, and a sleeve associated with said member and serving as an abutment against which one end of said second spring bears, said sleeve serving also as a stop to limit movement of said member in said timing-advancing direction.

8. A fuel injection pump of the type by-passing a quantity of excess fuel at each cycle of operation and having adjustable timing means for varying the time of beginning a fuel injection cycle, characterized by the provision of a chamber for receiving the by-passed excess fuel, a restricted outlet for escape of fuel from said chamber so that an increase or decrease in the quantity of excess fuel delivered to said chamber per unit of time tends to produce respectively an increase or decrease in the fuel pressure within said chamber, a piston movable in response to pressure changes within said chamber, a piston rod movable with said piston, a connection between said piston rod and said adjustable timing means to move said means in timing-advancing direction upon an increase in pressure in said chamber and in timing-retarding direction upon a decrease in pressure within said chamber, a spring tending constantly to move said piston rod in timing-retarding direction, a sleeve slidably mounted on said piston rod for movement therealong throughout a limited range, a stationary abutment with which said sleeve comes into contact upon predetermined movement of said sleeve with said rod in a timing-advancing direction, so that upon continued further movement of said rod in said direction said sleeve will be held by said abutment and said rod will move relatively to said sleeve, and a second spring interposed between said piston rod and said sleeve and reacting against both of them to tend to move said sleeve in a direction toward said abutment and to tend to move said piston rod in a timing-retarding direction.

9. A construction as described in claim 8, in which said sleeve, when in contact with said stationary abutment, acts as a stop to limit the possible extent of movement of said piston and said piston rod in a timing-advancing direction.

10. A fuel injection pump of the type by-passing a quantity of excess fuel at each cycle of operation and having adjustable timing means for varying the time of beginning a fuel injection cycle, characterized by the provision of a chamber for receiving the by-passed excess fuel, a restricted outlet for escape of fuel from said chamber so that an increase or decrease in the quantity of excess fuel delivered to said chamber per unit of time tends to produce respectively an increase or decrease in the fuel pressure within said chamber, means responsive to a change in pressure within said chamber for changing the adjustment of said timing means to advance the timing upon an increase in pressure and to retard the timing upon a decrease in pressure within said chamber, means for varying the quantity of excess fuel by-passed at each cycle of operation of the pump, and means for concomitantly varying the effective size of said restricted outlet so as to neutralize approximately the effect on pressure within said chamber which would otherwise be produced by changes in said quantity of by-passed fuel at each cycle of operation of the pump.

11. A construction as described in claim 10, in which said pump has a movable control member, and said means for varying the size of said outlet is actuated by said control member.

12. A construction as described in claim 10, in which said pump has a speed-responsive governor, a movable control member for the pump, and a connection between said control member and said means for varying the size of said outlet to actuate the latter in accordance with the movements of the former, independently of said governor.

13. A construction as described in claim 10, in which said pump has a movable control member, a speed responsive governor for regulating said control member, an adjusting member for actuating said control member jointly with said governor, and a connection between said adjusting member and said means for varying the size of said outlet to actuate the latter in accordance with the movements of said adjusting member.

HANS FISCHLMAYR.